(No Model.)

F. H. SPEED.
DEVICE FOR STRETCHING WIRE.

No. 473,528. Patented Apr. 26, 1892.

Witnesses
Albert Popkins
Sherburne G. Hopkins

Inventor
Fred H. Speed
By Thos. S. Hopkins
His Attorney

UNITED STATES PATENT OFFICE.

FRED H. SPEED, OF ROCKLAND, MAINE, ASSIGNOR TO EDMUND N. WILCOX, OF MERIDEN, CONNECTICUT.

DEVICE FOR STRETCHING WIRE.

SPECIFICATION forming part of Letters Patent No. 473,528, dated April 26, 1892.

Application filed February 18, 1891. Serial No. 381,775. (No model.)

*To all whom it may concern:*

Be it known that I, FRED H. SPEED, a citizen of the United States, residing at Rockland, in the county of Knox and State of Maine, have invented certain new and useful Improvements in Devices for Stretching Wires; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in devices for stretching electric-light wires in houses; and it consists in certain novel features hereinafter described and claimed.

The special object of my invention is to provide a device of a cheap and simple construction that can be effectually and easily operated to stretch wires secured against a flat surface—such, for instance, as the wall or ceiling of a room. This object I accomplish by the use of the mechanism illustrated in the annexed drawings, in which—

Figure 1:
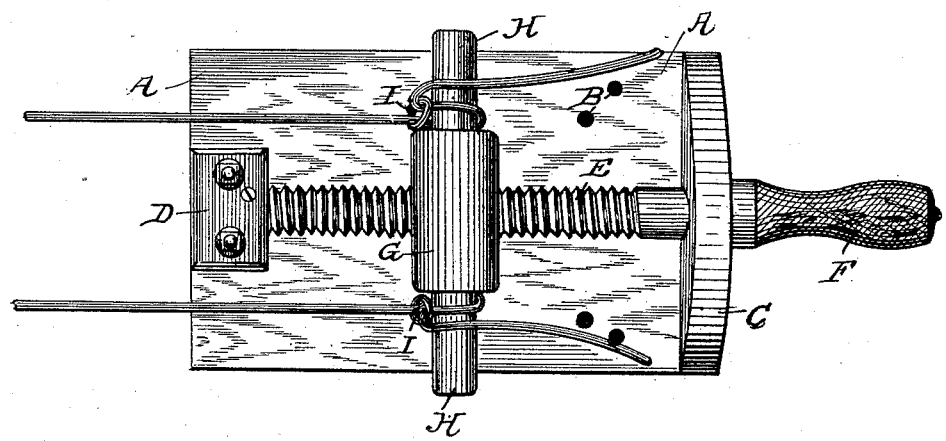
Figure 2:
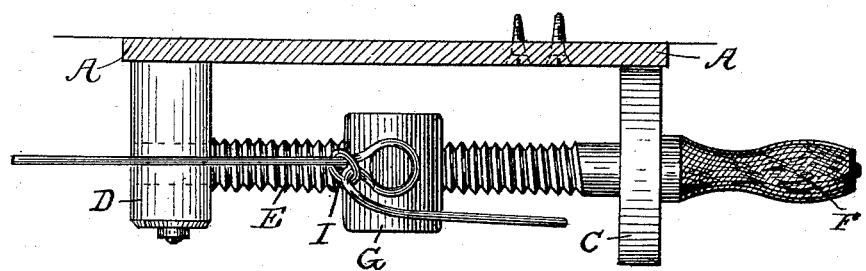
Figure 3:
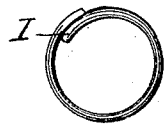

Figure 1 is a top plan view of my improved device. Fig. 2 is a view in position on the ceiling, and Fig. 3 is a view of the ring.

In carrying out my invention I employ a base-plate A, which is secured to the wall or ceiling of the room by screws or other suitable fastening means inserted through the perforations B into the wall or ceiling. On the outer side of the base-plate, at the ends of the same, I provide the lugs or bearings C, which may be formed integral with or separate from the base-plate, as desired. In the drawings I have shown one of the bearings as formed by a rib on the base-plate and the other formed by a box D, secured thereon. A screw or worm shaft E is mounted in these bearings, as shown, and is provided with a handle F at its outer end, by means of which it may be readily rotated by the operator. The threads of the screw or worm shaft terminate a short distance from the ends of the same, so that the surface of the shaft in the bearings is smooth, and consequently the shaft will not move longitudinally therein when it is rotated.

A nut or slide G is mounted on the screw or worm shaft and is provided with the arms H at its ends, the purpose of which will be presently pointed out. This nut or slide is provided with internal threads in its central perforation which engage the threads of the shaft, so that when the shaft is rotated the nut will be caused to move along the same.

In practice the device is secured to the wall or ceiling of the room adjacent to the ends of the wires. The free ends of the wires are then passed through the open rings I I and around the arms projecting from the ends of the nut, after which they are again passed through the rings and turned backward or doubled on themselves, as shown most clearly in Fig. 1. The handle is then grasped by the operator and rotated, thus turning the shaft and causing the nut to travel toward the end of the same. The wire will be prevented from slipping from the nut by the rings and will therefore be stretched or drawn taut.

It will be readily observed from the foregoing description that my device is extremely simple in its construction and that it can be, consequently, manufactured at a trifling cost. It is composed of very few parts and those few are compactly arranged, so that it can be secured to the wall or ceiling without disfiguring the same or taking up much space.

By my device a steady pull is exerted upon the wires and each wire receives the same amount of strain, so that there is very little liability of the wires being drawn from their cleats or fastenings. It is obvious that my device can be easily and effectually operated against a flat surface, as it is necessary to provide only sufficient space between the handle and the wall to accommodate the fingers of the operator when he grasps the handle.

The strain put upon the wires in the operation of my device is steady and constant, and there are no violent jerks which are liable to break the wires or pull the cleats or fastenings loose. It will be understood, of course, that the manner of fastening the wires to the nut is immaterial, and such fastening may be accomplished in any desired manner. I prefer, however, to employ the rings shown and described, as that form of fastening is very simple and effective.

Having thus described my invention, what I claim, and desire to secure by Letters Patent, is—

The improved device for stretching wires herein described and shown, consisting of a base-plate provided with the bearings C D, the worm-shaft swiveled in the said bearings, and the slide mounted on the worm-shaft and provided with lateral arms adapted to be engaged by bights in the wires, as specified.

In testimony whereof I affix my signature in presence of two witnesses.

FRED H. SPEED.

Witnesses:
M. PROSPERI,
S. G. HOPKINS.